US010862953B2

(12) United States Patent
Wang et al.

(10) Patent No.: US 10,862,953 B2
(45) Date of Patent: Dec. 8, 2020

(54) TECHNIQUES FOR PREDICTION OF POPULARITY OF MEDIA

(71) Applicant: WP Company LLC, Washington, DC (US)

(72) Inventors: Shuguang Wang, Washington, DC (US); Eui-Hong Han, Washinton, DC (US); Yaser Keneshloo, Arlington, VA (US); Naren Ramakrishnan, Arlington, VA (US)

(73) Assignees: WP COMPANY LLC, Washington, DC (US); Virginia Polytechnic Institute and State University, Arlington, VA (US)

( * ) Notice: Subject to any disclaimer, the term of this patent is extended or adjusted under 35 U.S.C. 154(b) by 692 days.

(21) Appl. No.: 15/587,814

(22) Filed: May 5, 2017

(65) Prior Publication Data

US 2017/0323210 A1    Nov. 9, 2017

Related U.S. Application Data

(60) Provisional application No. 62/333,093, filed on May 6, 2016.

(51) Int. Cl.
*H04L 29/08* (2006.01)
*G06N 20/00* (2019.01)

(52) U.S. Cl.
CPC .............. *H04L 67/10* (2013.01); *H04L 67/02* (2013.01); *H04L 67/22* (2013.01); *G06N 20/00* (2019.01)

(58) Field of Classification Search
CPC ......... G06N 20/00; H04L 67/10; H04L 67/02; H04L 67/22
See application file for complete search history.

(56) References Cited

U.S. PATENT DOCUMENTS 7,568,148 B1 *   7/2009   Bharat .................... H04L 67/02
                                                        715/200
8,346,229 B2    1/2013    Scott
(Continued)

OTHER PUBLICATIONS

Bandari, R.; Asur, S.: and Huberman. B. A., "The Pulse of News in Social Media: Forecasting Popularity," Co RR abs/ 1202.0332, 2012 (8 pages).
(Continued)

*Primary Examiner* — Alan Chen
(74) *Attorney, Agent, or Firm* — Wilmer Cutler Pickering Hale and Dorr LLP

(57) ABSTRACT

An article of manufacture for predicting the popularity of media may include at least one processor readable storage medium and instructions stored on the at least one medium. The instructions may be configured to be readable from the at least one medium by at least one processor and may thereby cause the at least one processor to operate so as to determine a publication time associated with digital media, set a predetermined time threshold based on the publication time, analyze the digital media to determine at least one feature associated with the digital media, compile the determined at least one feature, predict a popularity associated with the digital media based on the compiled at least one feature, and output the predicted popularity. The at least one feature associated with the digital media may be determined before the predetermined time threshold.

21 Claims, 10 Drawing Sheets

(56) References Cited

U.S. PATENT DOCUMENTS

| | | | | |
|---|---|---|---|---|
| 9,122,989 | B1* | 9/2015 | Morris | G06Q 30/02 |
| 9,189,805 | B2 | 11/2015 | Huang et al. | |
| 9,846,836 | B2* | 12/2017 | Gao | G06F 16/9032 |
| 9,852,215 | B1* | 12/2017 | Sullivan | G06F 16/335 |
| 2007/0276732 | A1 | 11/2007 | Lee et al. | |
| 2009/0319518 | A1* | 12/2009 | Koudas | G06F 16/951 |
| 2010/0118941 | A1 | 5/2010 | Taylor et al. | |
| 2010/0241597 | A1* | 9/2010 | Chen | G06F 16/958 706/12 |
| 2011/0302103 | A1* | 12/2011 | Carmel | G06Q 10/10 705/347 |
| 2013/0204170 | A1 | 8/2013 | Zeng et al. | |
| 2013/0311408 | A1* | 11/2013 | Bagga | G06N 20/00 706/12 |
| 2014/0019443 | A1* | 1/2014 | Golshan | G06F 16/9535 707/723 |
| 2014/0040277 | A1* | 2/2014 | Asur | G06Q 10/04 707/748 |
| 2014/0095328 | A1 | 4/2014 | Forouzandeh et al. | |
| 2015/0082339 | A1 | 3/2015 | Sumitomo et al. | |
| 2015/0161517 | A1* | 6/2015 | Bae | G06Q 50/01 709/204 |
| 2016/0034712 | A1* | 2/2016 | Patton | H04W 4/21 726/28 |
| 2016/0247203 | A1 | 8/2016 | Yavonditte et al. | |
| 2016/0300141 | A1* | 10/2016 | Veeraragavan | G06Q 30/02 |
| 2016/0321261 | A1* | 11/2016 | Spasojevic | G06F 16/24578 |
| 2017/0140291 | A1* | 5/2017 | Wu | G06N 7/005 |
| 2018/0082340 | A1 | 3/2018 | Freund et al. | |

OTHER PUBLICATIONS

Berger, J., and Milkman, K., "Social Transmission, Emotion, and the Virality of Online Content," Wharton Research Paper, 2010 (1 page).
Berger, J. and Milkman, K. L., "What Makes Online Content Viral?" Journal of Marketing Research, 49(2):192-205, 2011 (17 pages).
Berger, J., and Schwartz, E. M., "What Drives Immediate and Ongoing Word of Mouth?" Journal of Marketing Research, 48(5):869-880, 2011 (12 pages).
Berger, J., "Arousal Increases Social Transmission of Information," Journal of Psychological Science, 22(7):891-893, 2011.
Borghol, Y.; Ardon, S.; Carlsson, N.; Eager, D.: and Mahanti, A., "The Untold Story of the Clones: Content-Agnostic Factors that Impact YouTube Video Popularity," In Proceedings of the SIGKDD' 12, 1186-1194, 2012 (9 pages).
Castillo, C.; El-Haddad, M.; Pfeffer, J.; and Stempeck, M., "Characterizing the life cycle of online news stories using social media reactions," In Proceedings of the CSCW'14, 211-223, 2013 (12 pages).
Cha, M.; Kwak, H.; Rodriguez, P.; Ahn, Y.-Y.; and Moon, S., "Analyzing the Video Popularity Characteristics of Large-Scale User Generated Content Systems," IEEE/ ACM Transactions on Networking (TON) 17(5):1357-1370, 2009 (14 pages).
Cherkasova, L., and Gupta, M., "Analysis of enterprise media server workloads: access patterns, locality, content evolution, and rates of change," IEEE/ ACM Transactions on Networking, 12(5):781-794, 2004 (19 pages).
DuBay, "The Principles of Readability," Online Submission (2004) (75 pages).
Freedman, D. "Statistical Models: Theory and Practice,"Cambridge University Press, 2009 (11 pages).
Gürsun, G. et al., "*Describing and forecasting video access patterns,*" In *Proceedings of IEEE INFOCOM*'11, 16-20, 2011 (9 pages).
Hutto, C. J., and Gilbert, E. "Vader: A parsimonious rule-based model for sentiment analysis of social media text," In Proceedings of the ICWSM' 14, 2014 (10 pages).
Kong, Shoubin, Ye, Fei, and Feng, Ling, "Predicting future retweet counts in a microblog," Journal of Computational Information Systems 10(4):1393-1404, 2014 (12 pages).
Kwak, H.; Lee, C.; Park, H.; and Moon. S., "What is twitter, a social network or a news media?" In Proceedings of the WWW'10, 591-600, 2010 (10 pages).
Lee, J. G.; Moon, S.; and Salamatian, K., "Modeling and predicting the popularity of online contents with cox proportional hazard regression model," Journal of Neurocomputing 76(1):134-145, 2012 (12 pages).
Lerman, K., and Hogg, T., "Using a model of social dynamics to predict popularity of news," In Proceedings of WWW' 10, 621-630, 2010 (10 pages).
Marujo, L.; Bugalho, M.; Neto, J. P. d. S.; Gershman. A.; and Carbonell, J., "Hourly traffic prediction of news stories," CARS'11, Oct. 23, 2011, Chicago, Illinois, USA (5 pages).
Mishne, G., and De Rijke, M., "A study of blog search," In Advances in information retrieval, Springer. 289-301, 2006 (13 pages).
Pinto, H.; Almeida, J. M.; and Goncalves, M. A., "Using early view patterns to predict the popularity of YouTube videos," In Proceedings of the WSDM' 13, 365-374, 2013 (10 pages).
Reis, J., Benevenuto, F., Vaz de Melo, P., Prates, R., Kwak, H., and An, J., "Breaking the News: First Impressions Matter on Online News," arXiv preprint arXiv:1503.07921, 2015 (10 pages).
Szabo, G., and Huberman, B. A., "Predicting the popularity of online content," Communications of the ACM 53(8):80-88, 2010 (9 pages).
Tatar, A. et al., "A Survey on Predicting the Popularity of web content," Journal of Internet Services and Applications, 5(1):1-20, 2014 (20 pages).
Tatar, A., et al., "Ranking news articles based on popularity prediction," In Proceedings of ASONAM'12, 106-110, 2012 (5 pages).
Tsagkias, et al., "Predicting the volume of comments on online news stories," In Proceedings of the CIKM'09, 1765-1768, 2009 (4 pages).
Zaman, T. et al., "A bayesian approach for predicting the popularity of tweets," The Annals of Applied Statistics, 8(3):1583-1611, 2014 (31 pages).
Zhao, Q.; Erdogdu, M. A.; He, H. Y.; Rajaraman, A.; and Leskovec, J., "Seismic: A self-exciting point process model for predicting tweet popularity," CoRR abs/1506.02594, 2015 (10 pages).
International Search Report and Written Opinion dated Nov. 25, 2019 received in related International Application No. PCT/US2019/ 052144 filed Sep. 20, 2019 (10 pages).
U.S. Appl. No. 16/577,795, filed Sep. 20, 2019, Jeffrey Mark Turner.

* cited by examiner

TECHNIQUES FOR PREDICTION OF POPULARITY OF MEDIA

CROSS-REFERENCE TO RELATED APPLICATIONS

This patent application claims priority to U.S. Provisional Patent Application No. 62/333,093, filed on May 6, 2016, the contents of which are incorporated by reference herein in their entirety.

FIELD OF THE DISCLOSURE

The present disclosure generally relates to data processing and analysis. More specifically, the present disclosure relates to techniques for predicting the popularity of media, such as a news article, using data processing and analysis.

BACKGROUND OF THE DISCLOSURE

Digital media may have varying degrees of popularity. For example, when a newspaper article is posted on a website, visitors of the website may read the article or ignore the article. Visitors may share the article with friends and/or followers on social media, or may not share the article. Indeed, popularity of an article may be measured in numerous ways. For example, the number of article views and/or the number of article shares on social media may be analyzed. Alternatively, or in addition, the number of likes on social media and/or the number of searches in a search engine may be analyzed.

Predicting the popularity of media may be challenging. Challenges may arise for many reasons. For example, people consume digital media in numerous ways and, as discussed above, there are multiple measures of popularity. Conventional prediction models may struggle with processing and analyzing the complex and large amounts of data related to these aspects, and may therefore generate inaccurate predictions. Additionally, article popularity can be defined in different contexts, such as local or global. Local context may relate to digital media within a local environment, such as the popularity of a news article by single news agency relative to other articles published by that news agency (e.g., the popularity of a Washington Post article relative to other Washington Post articles). Global context may relate to ascertaining popularity of a news article published by a first news agency relative to other articles published by other news agencies. Conventional prediction models may struggle to accurately predict popularity in both local and global contexts.

Moreover, conventional models may require a large amount of time to determine media popularity with requisite accuracy. After such time passes, the media may no longer be relevant, and opportunities for taking actions based on the media popularity may have passed. For example, journalists and editors may miss opportunities to refine popular articles, and/or advertisers may miss potentially beneficial advertising space within popular articles.

Therefore, a need may exist for systems and methods that predict the popularity of media and overcome shortcomings associated with conventional processes.

SUMMARY OF THE DISCLOSURE

In some embodiments, an article of manufacture for predicting the popularity of media may include at least one processor readable storage medium and instructions stored on the at least one medium. The instructions may be configured to be readable from the at least one medium by at least one processor and may thereby cause the at least one processor to operate so as to determine a publication time associated with digital media, set a predetermined time threshold based on the publication time, analyze the digital media to determine at least one feature associated with the digital media, compile the determined at least one feature, predict a popularity associated with the digital media based on the compiled at least one feature, and output the predicted popularity. The at least one feature associated with the digital media may be determined before the predetermined time threshold.

In some embodiments, the at least one feature may include one or more of a temporal feature, social feature, contextual feature, and metadata feature associated with the digital media.

In some embodiments, the temporal feature may include a time difference between a publishing time of the digital media and a first view of the digital media.

In some embodiments, the temporal feature may include a number of views of the digital media within a first time period after publication.

In some embodiments, the temporal feature may include a rate at which the digital media is read within a first time period after publication.

In some embodiments, the temporal feature may include a time series of views of the digital media in a first time period after publication.

In some embodiments, the social feature may include a time difference between the publication time of the digital media and the first post or interaction on one or more social media platforms regarding the digital media.

In some embodiments, the social feature may include a number of posts on one or more social media platforms regarding the digital media in a first time period after the publication time of the digital media.

In some embodiments, the social feature may include a rate at which the digital media is shared within a first time period after the publication time of the digital media.

In some embodiment, the contextual feature may include one or more sentiment scores regarding the title of digital media and body of the digital media.

In some embodiments, the contextual feature may include one or more of the number of named entities that are present in the digital media.

In some embodiments, the contextual feature may include a freshness rating that indicates relevancy of the digital media compared to other digital media.

In some embodiments, the predicting may include calculating a plurality of predictions using a plurality of different regression models.

In some embodiments, the plurality of different regression models may each be used in combination with a different one of the at least one feature associated with the digital media.

In some embodiments, the plurality of predictions may include weighted and combined to form an overall prediction associated with the digital media.

In some embodiments, a system for predicting the popularity of media may include one or more processors communicatively coupled to a network, wherein the one or more processors may be configured to determine a publication time associated with digital media, set a predetermined time threshold based on the publication time, analyze the digital media to determine at least one feature associated with the digital media, compile the determined at least one feature, predict a popularity associated with the digital media based on the compiled at least one feature, and output the predicted popularity. The at least one feature associated with the digital media may be determined before the predetermined time threshold.

In some embodiments, the predicting may include calculating a plurality of predictions using a plurality of different regression models In some embodiments, the plurality of different regression models may each be used in combination with a different one of the plurality of features.

In some embodiments, the plurality of predictions may be weighted and combined to form an overall prediction associated with the digital media.

In some embodiments, a system for predicting the popularity of media may include at least one processor that may be configured to analyze a digital media hosted on a server. The analyzing may include determining a plurality of features associated with the digital media. The plurality of features may include a temporal feature, a social feature, a contextual feature, and a metadata feature. The at least one processor may further be configured to compile the determined plurality of features in real time along with activity associated with the digital media. The activity associated with the digital media may include a determined number of interactions with the digital media on at least one social media platform. The at least one processor may further be configured to predict a popularity associated with the digital media based on the compiled plurality of features and activity. The system may further include at least one memory that may be coupled to the at least one processor and may be configured to provide the at least one processor with instructions.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

By its nature, the life span of digital media following publication may be short. For example, news articles may soon be outdated because further details associated with the story in of the article may emerge, or public interest in the article may pass. Therefore, it may be beneficial to predict popularity of digital media for a time period shortly after publication, such as for the first 24 hours after publication, for example. Providing a prediction of popularity this earlier in the media lifespan may, for example, allows editors and journalists to prioritize and enrich media that may be very popular to enhance reader experience. Moreover, underperforming digital media may be identified early so that content can be varied. Additionally, advertising associated with the digital media may be adjusted in view of the popularity prediction.

In accordance with embodiments of the present disclosure, the popularity of digital media for a first time period after publication of the digital media may be predicted based on the number of views of the digital media within a second time period after publication. The first time period may be 24 hours, for example. The second time period may be 30 minutes, for example. Views may be views from computing devices such as personal computers, laptop computers, cellular phones, tablet computers, and the like, that access digital media.

Figure 1:
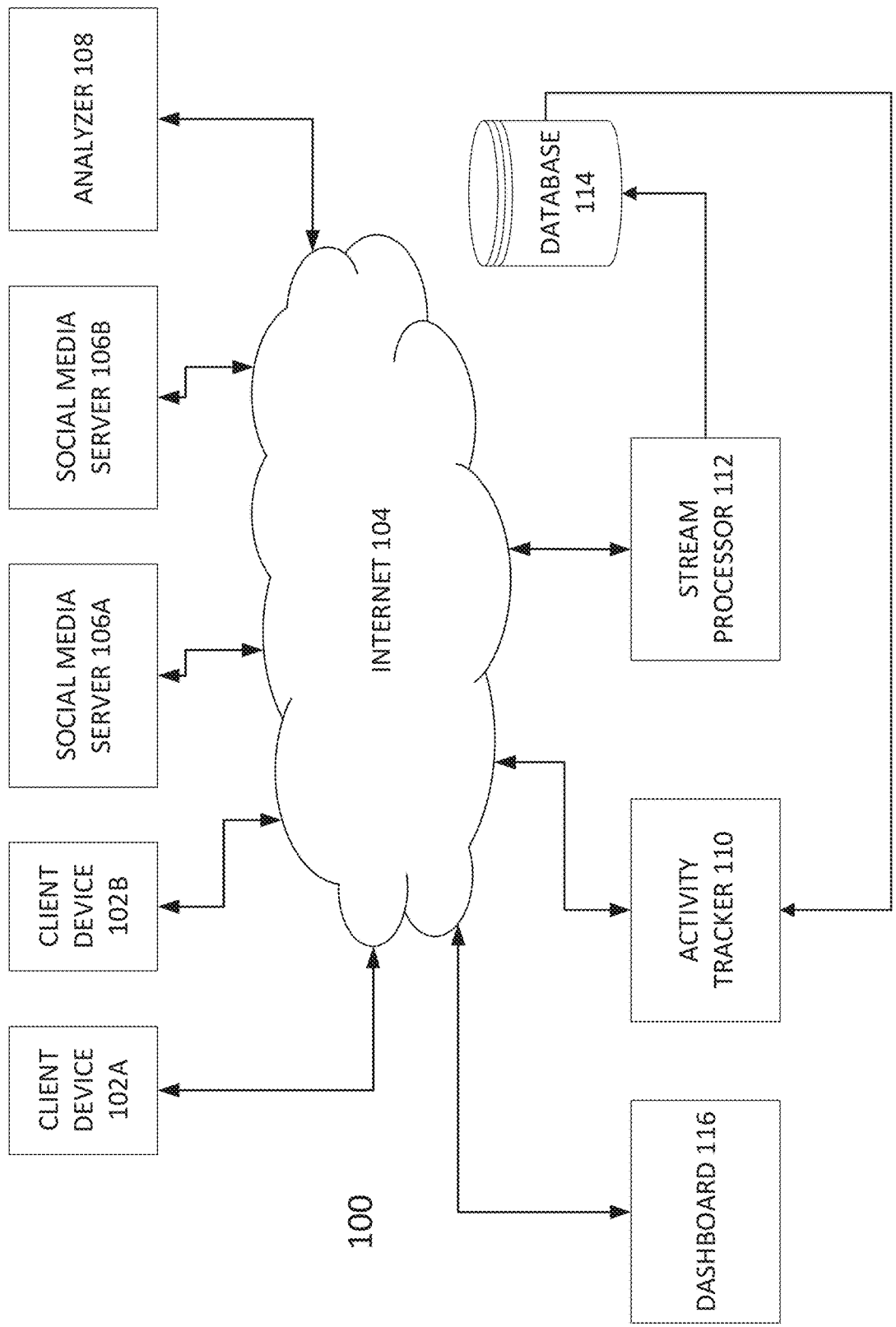
FIG. 1 shows a system in accordance with embodiments of the present disclosure.

FIG. 1 shows a system 100 in accordance with embodiments of the present disclosure. System 100 may include multiple client devices, such as client devices 102A and 102B. While only two client devices are shown in system 100, more than two client devices may be present in system 100. Client devices 102A and 102B may be computing devices such as personal computers, laptop computers, cellular phones, tablet computers, and the like, that access digital media. Client devices 102A and 102B may access digital media via Internet web browsers. Internet web browsers may be standalone applications that are present on client devices 102A and 102B, or may be platforms that are present within social media applications such as Facebook or Twitter, for example.

System 100 may also include the Internet 104. Internet 1004 may facilitate the transmission and reception of data between different elements that are connected to it.

System 100 may further include social media servers 106A and 106B. While only two social media servers are shown in system 100, more than two may be present in system 100. Social media server 106A may contain data related to a social media platform such as Facebook, for example. Social media server 106B may contain data related to a different social media platform, such as Twitter, for example. A client device 102A or 102B may access one or more of social media servers 106A and 106B via Internet 104. For example, a user of client device 102A may have an account with a social media platform (e.g., Facebook) associated with social media server 106A, and may therefore access social media server 106A to view and/or post and/or edit content on the social media platform. The user may further interact with other users of the social media platform by accessing social media server 106A.

System 100 may include analyzer 108. Analyzer 108 may analyze digital media to determine features that help predict popularity of digital media. For example, analyzer 108 may analyze one or more of temporal features, social features, contextual features, and metadata regarding digital media.

Temporal features may include, for example, one or more of first view time difference, first 30 minute view, page view acceleration, and page view time series. The first view time difference may be the time difference between publishing time of the digital media and the first view of the digital media. This feature captures how fast people react to the digital media. For viral media, this number may be smaller relative to ordinary media.

First 30 minute view may be the number of views of the digital media 30 minutes after publication. The number of page views in the first 30 minutes for viral digital media may be much larger relative to ordinary media.

Page view acceleration may indicate the rate at which the digital media is read within the first 30 minutes after publication. Page view acceleration may be represented by the following equation:

$$\text{Acceleration} = \frac{\sum_{t=2}^{N} n_t^x - n_{t-1}^x}{N}$$

where $n_t^x$ is the number of views of the digital media during at time interval t, and N is the total number of time intervals within the first 30 minutes after media publication. For example, for a 5 minute time interval for 30 minutes, N may equal 6.

Page view time series may indicate a time series of views of the digital media in the first 30 minutes after publication, and may be organized in 5-minute intervals. The page view time series may be normalized with respect to the time series of other digital media published at the same time. For example, given m number of digital media that are published at the same time, the normalized time series may be as follows:

$$NC_t = \frac{n_t^x}{\sum_{i=1}^{m} n_t^i}$$

where $n_t^x$ is the total number of views of the digital media x within the time interval t, and $n_t^i$ is the total number of page views of the ith media that is published at the same time as media x. Normalization of the page view time series may also be performed with respect to all articles published within a time period, such as a number of hours, before publication of the digital media. The normalized count may provide the relative importance of a digital media amount other media that are published. A normalized count closer to one means that the media is receiving more attention relative to other media published at the same time or within a time period.

Social features may include features related to social media interactions with digital media. For example, social features may include one or more of first post time difference, first 30 minute post volume, first 30 minute followers' number, post/follower acceleration, and post/follower time series.

First post time difference may indicate the time difference between the publishing time of the digital media and the first post or interaction on one or more social media platforms regarding the digital media. For example, the first post may be a post tagging the digital media on Facebook, or a tweet of the digital media on Twitter. The first interaction may be the "liking" of the digital media on Facebook. The first post may be recognized because a URL related to the digital media is implicated in the post. This feature may analyze how fast media is shared or spread on one or more social media platforms. Viral media may be shared or spread faster relative to non-viral media.

When a post or interaction is recognized, analyzer 108 may access the profile of the user how posted or interacted with the media, and may generate its own profile for the user. This profile may include the number of extracted followers and/or friends of the user, as well as the number of shares and/or likes and/or posts and/or other social media interactions they have performed. This profile may additionally be used in popularity prediction.

First 30 minute post volume may be the number of posts and/or interactions on one or more social media platforms regarding the digital media in the first 30 minutes after publication of the digital media. For example, first 30 minute post volume may indicate the number of times in the first 30 minutes after publication of digital media that a user of Facebook has tagged the digital media in a post or "liked" the digital media on Facebook.

First 30 minute followers' number may indicate the number of friends and/or followers of a social media user who, in the first 30 minutes after publication of the digital media, each post and/or interact with the digital media that has been posted or interacted with by the social media user. This feature provides an indication of the friends and/or followers of the social media user who actually were exposed to the digital media that the user interacted with.

Post/follower acceleration may indicate the rate at which digital media is being shared within the first 30 minutes after publication. For example, this metric may indicate the rate at which digital media is being shared on Facebook or tweeted on Twitter. Post/follower acceleration may be calculated in similar or the same fashion to as discussed above in regard to page view acceleration.

Post/follower time series may indicate a time series of social media posts regarding digital media in the first 30 minutes after publication of the digital media, and may be organized in 5 minute intervals. The post/follower time series may be normalized in similar or the same fashion to as discussed above in regard to the page view time series.

Contextual features may include one or more of sentiment, named entities, readability, and freshness. Sentiment may include one or more sentiment scores regarding the title of digital media and body of the digital media. The sentiment scores may analyze one or more of the title and body, and determine whether each is directed to negative, positive, compound, or neutral score. The sentiment score may be influenced by the kind of language that is used in the digital media.

Named entities may indicate one or more of the number of persons, locations, and organizations, for example, named in the digital media. For example, named entities may indicate whether a certain politician, celebrity, or athlete is named in the article, and determined the number of occurrences of such naming. Media that includes information about a well-known individual may significantly contribute to popularity of digital media.

Readability may indicate how easily the digital media is to read. For example, readability may analyze one or more of the word-length, kind of words used in the digital media (e.g., whether complex words are used), sentence length, and number of syllables within the text. The number of sentences, percentage of complex words within the total number of words, average number of syllables per word, average number of words per sentence, average sentence length, length of the title, and length of the digital media may be analyzed in the readability analysis.

Freshness may indicate how the digital media is potentially relevant when compared to other local or global media. For example, freshness may analyze one or more of the topic, click count of a number of similar media, interaction count of a number of similar media, content similarity of similar media, and number of similar media in a historical data set or archive. For example, topic intersection with previous digital media may be analyzed to determine freshness.

Topic intersection (TI) may be determined using the equation below:

$$TI = \frac{|keywords_q \cap keywords_a|}{|keywords_q \cup keywords_a|}$$

where $keywords_q$ and $keywords_a$ are the sets of keywords in the queried digital media (i.e., the digital media for which prediction is being calculated) and the number of similar digital media, respectively. TI may be closer to zero for fresh or new digital media, and closer to one for digital media that is not fresh.

Metadata regarding digital media may include one or more of media type, media category, media section, publication data, and author name. Media type may indicate the kind of digital media that is under analysis. For example, media type may indicate whether the digital media is a blog post or an article. Media category may indicate the subject matter of the digital media, such as whether the media is directed to news, sports, science, or is a research piece, for example. Media section may indicate the section where digital media is located on a website or platform. For example, media section may indicate whether digital media is located in the sports, opinion, or politics section of a website or platform, for example. Publication data may indicate the time of day and/or day of the week that digital media is published to a website and/or platform. Author name may indicate the name of the author or authors who produced the digital media. Metadata may further include one or more of title, content, and keyword information.

System 100 may include activity tracker 110. Activity tracker 110 may track activity associated with digital media viewed by client devices 102A and/or 102B. For example, activity tracker 110 may track the number of views, clicks, or other interactions with digital media performed client devices 102A and/or 102B. Activity tracker 110 may track the number of shares of digital media by client devices 102A and/or 102B. Activity tracker 110 may track indicators associated with digital media, such as "likes," emoticons associated with the article, or other indicators used to interact with digital media by users of client devices 102A and/or 102B. Activity tracker 110 may communicate with analyzer 108 and provide activity information to analyzer 108. Analyzer 108 may thereafter perform its analysis to determine features that help predict popularity of digital media.

System 100 includes stream processor 112. Stream processor 112 may receive and compile activity that is tracked by activity tracker 110, as well as media features determined by analyzer 108. The reception and/or compilation may take place in real-time. Stream processor 112 may alternatively (or in addition), also receive data from client devices 102A and/or 102B and/or social media servers 106A and/or 106B via Internet 104 and compile data from these elements. Stream processor 112 may perform popularity prediction in accordance with embodiments of the present disclosure. For example, stream processor 112 may receive and compile data regarding digital media from the various elements of system 100, and use regression analysis to determine a popularity prediction of the digital media. Stream processor 112 may predict the popularity of digital media using one or more of the temporal, social, content, and metadata features determined by analyzer 108 in conjunction with a baseline regression model. The baseline regression model may be a multi linear regression, LASSO regression, ridge regression, or tree regression model. Each model may be used in combination with one or more of the temporal, social, content, and metadata features to generate an overall popularity prediction. Therefore, multiple popularity predictions may be generated. Alternatively, only one or a number of the models may be utilized along with the different features, and one or a number of popularity predictions may be generated. Prediction may include weighting one or more of the temporal, social, content, and metadata features and determining a weighted prediction. Moreover, predictions may further involve weighting each of multiple predictions that each use different prediction models and/or combinations of features, and generating an overall, combined prediction from a combination of the multiple, weighted predictions.

Stream processor 112 may further analyze datasets related to news agencies or other sources of information. For example, activity tracker 110 may track data related to other digital media posted by third parties and analyze these other digital media. Popularity prediction of other digital media may therefore be predicted. Stream processor 112 may further predict peak time of a digital media and potential viewing pattern graphs regarding digital media. This may be helpful to ensure that a server hosting digital media has enough bandwidth to handle multiple users interacting with and viewing a very popular piece of digital media. Stream processor 112 may further predict other kinds of engagement with digital media, normalize for presentation or social bias, and provide "what if" analysis that predicts how various edits or changes to articles may change digital media popularity.

System 100 includes database 114. While only one database 114 is shown in system 100, multiple databases may be present in system 100. One or more popularity predictions regarding digital media that is generated by stream processor 112 may be routed to database 114 and stored. Database 114 may output the one or more predictions to activity tracker 110, which may track their performance related to actual popularity. Activity tracker 110 may send such one or more predictions to stream processor 112 when additional predictions regarding the same or different digital media are determined.

Dashboard 116 may receive popularity prediction data generated for digital media from stream processor 112 and/or activity tracker 110, and may display such data via a graphical user interface (GUI). Further details regarding dashboard 116 will be explained.

Figure 2:
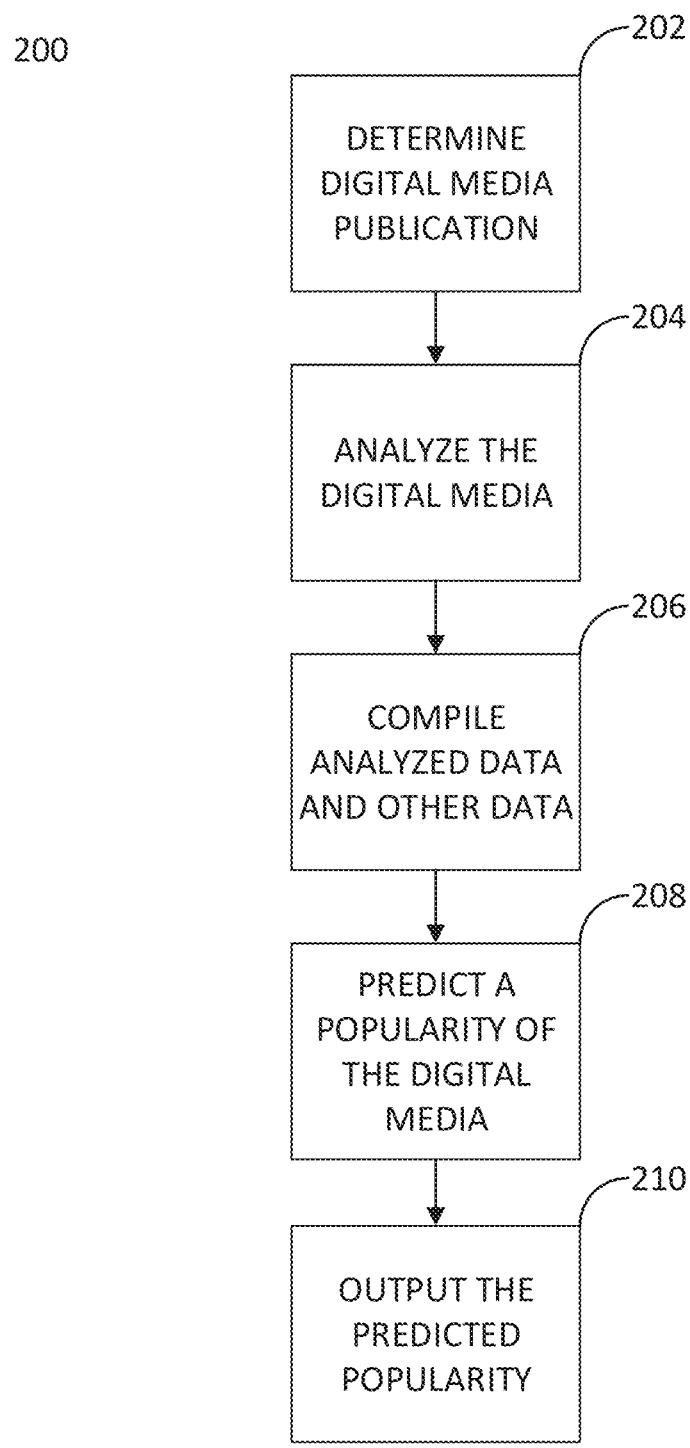
FIG. 2 shows a flow chart of a method in accordance with embodiments of the present disclosure.

FIG. 2 shows a flow chart of a method 200 in accordance with embodiments of the present disclosure. The method 200 of FIG. 2 may be implemented using the system shown in FIG. 1. Method 200 may be implemented via instructions stored on a non-transitory computer readable medium. Method 200 may be usable in a global or local context.

At step 202, the publication of digital media is determined. The digital media may be published to a website on the internet. Alternatively, the digital media may be published on an application platform. The time of publication may be recorded.

At step 204, analysis of the digital media may be performed to determine features of the digital media. The features may include one or more of the temporal features, social features, contextual features, and metadata discussed above. Tracked activity may be used in the analysis of digital media at step 204. For example, click streams, shares, likes, emoticons, and other indicators associated with the digital media may be used in the analysis. The analysis of step 204 may be performed by analyzer 108, for example. Activity tracked by activity tracker 110 may be sent to analyzer 108 so it can use such data in its analysis. The features of the digital media may be determined at step 204 within a predetermined time period associated with the determined time of publication of the digital media. For example, the digital media may be analyzed in step 204 within 30 minutes of the time of publication of the digital media.

At step 206, analysis date from step 204 may be compiled, along with other data that is relevant to the digital media. Such other data may be, for example, data from client devices 102A and/or 102B and/or social media servers 106A and/or 106B regarding the digital media. and compile data from these elements. The data may be compiled by stream processor 112, for example.

At step 208, the compiled data may be used to generate one or more popularity predictions regarding the digital media. For example, stream processor 112 may select a baseline model and use it in combination with one or more of the temporal, social, content, and metadata features to generate an overall popularity prediction of the digital media. Multiple popularity predictions using different baseline models and feature combinations may be generated in step 208 by stream processor 112. Prediction may include weighting one or more of the temporal, social, content, and metadata features and determining a weighted prediction. Moreover, predictions may further involve weighting each of multiple predictions that each use different prediction models and/or combinations of features, and generating an overall, combined prediction from a combination of the multiple, weighted predictions. Predictions may be generated in real time using each of the multiple models.

At step 210, the generated one or more predictions of the digital media popularity may be output. The predictions may be output to a dashboard, such as dashboard 116 of FIG. 1. The predictions may be tracked and displayed on dashboard 116, along with actual popularity of the digital media (e.g., along with actual digital media views, shares, likes, etc.). Alternatively, or in addition, the one or more predictions may be emailed to a recipient and/or output to a workflow platform.

Figure 3:
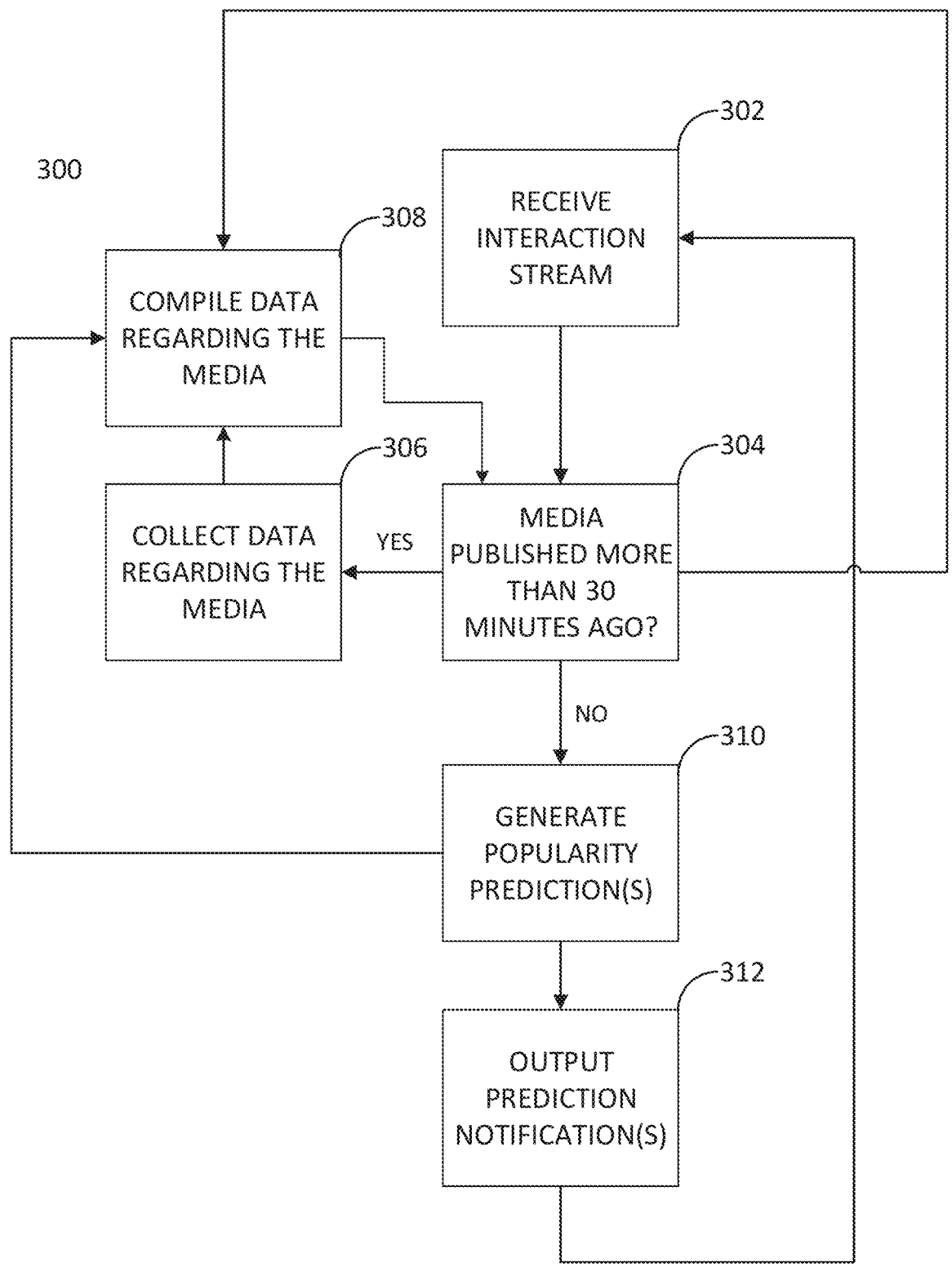
FIG. 3 shows a flow chart of another method in accordance with embodiments of the present disclosure.

FIG. 3 shows a flow chart of another method 300 in accordance with embodiments of the present disclosure. Method 300 may be implemented using the system shown in FIG. 1. Method 300 may be implemented via instructions stored on a non-transitory computer readable medium. Method 300 may be usable in a local or global context.

At step 302, an interaction stream regarding published digital media is received. The interaction stream may include one or more of, for example, clicks on the URL associated with published digital media, "likes" on one or more social media platforms of the digital media, and shares of the digital media on one or more social media platforms.

At step 304, it is determined whether the digital media was published more than 30 minutes ago. This determination may be made by analyzing the time when a URL associated with the digital media went live and was accessible to the public. If the answer is yes, the method continues to step 310. If the answer is no, the method continues to step 306. At step 304, one or more of the temporal, social, content, and metadata features (discussed above) regarding the digital media are sent for compilation in step 308 to update the current compiled features regarding the digital media.

At step 306, data regarding the digital media is collected. Such data may include, for example, one or more of a new click count for the digital media, the digital media URL, the number of "likes" on one or more social media platforms of the digital media, and the number of shares of the digital media on one or more social media platforms.

At step 308, the collected data is compiled. The compiled data may be stored in a database. Alternatively or in addition, the compiled data may be used for the prediction of other digital media which may be similar in content, title, topic, or any other way, to the digital media currently analyzed.

At step 310, popularity prediction(s) for the digital media may be generated. For example, stream processor 112 may select a baseline model and use it in combination with one or more of the temporal, social, content, and metadata features to generate an overall popularity prediction of the digital media. Multiple popularity predictions using different baseline models and feature combinations may be generated in step 310 by stream processor 112. Prediction may include weighting one or more of the temporal, social, content, and metadata features and generating a weighted prediction. Moreover, predictions may further involve weighting each of multiple predictions that each use different prediction models and/or combinations of features, and generating an overall, combined prediction from a combination of the multiple, weighted predictions. The generated prediction(s) may also be compiled at step 308 and used for the prediction of other digital media. Predictions may be generated in real time using each of the multiple models.

At step 312, the generated prediction(s) may be output as one or more prediction notifications. The prediction notifications may be emailed, sent to a workflow platform, and/or sent to a dashboard, such as dashboard 116. The predication notifications may indicate the popularity prediction for a digital media using different models, a combined popularity prediction using a number of models, and/or a comparison with actual popularity of the digital media (e.g., actual views, interactions, shares, like, tweets, etc., involving the digital media). After step 312, the process may be performed for the same digital media again to update the prediction for the digital media and the process may begin at step 302 again. Alternatively, a prediction for another digital media may be performed, starting at step 302.

Figure 4:
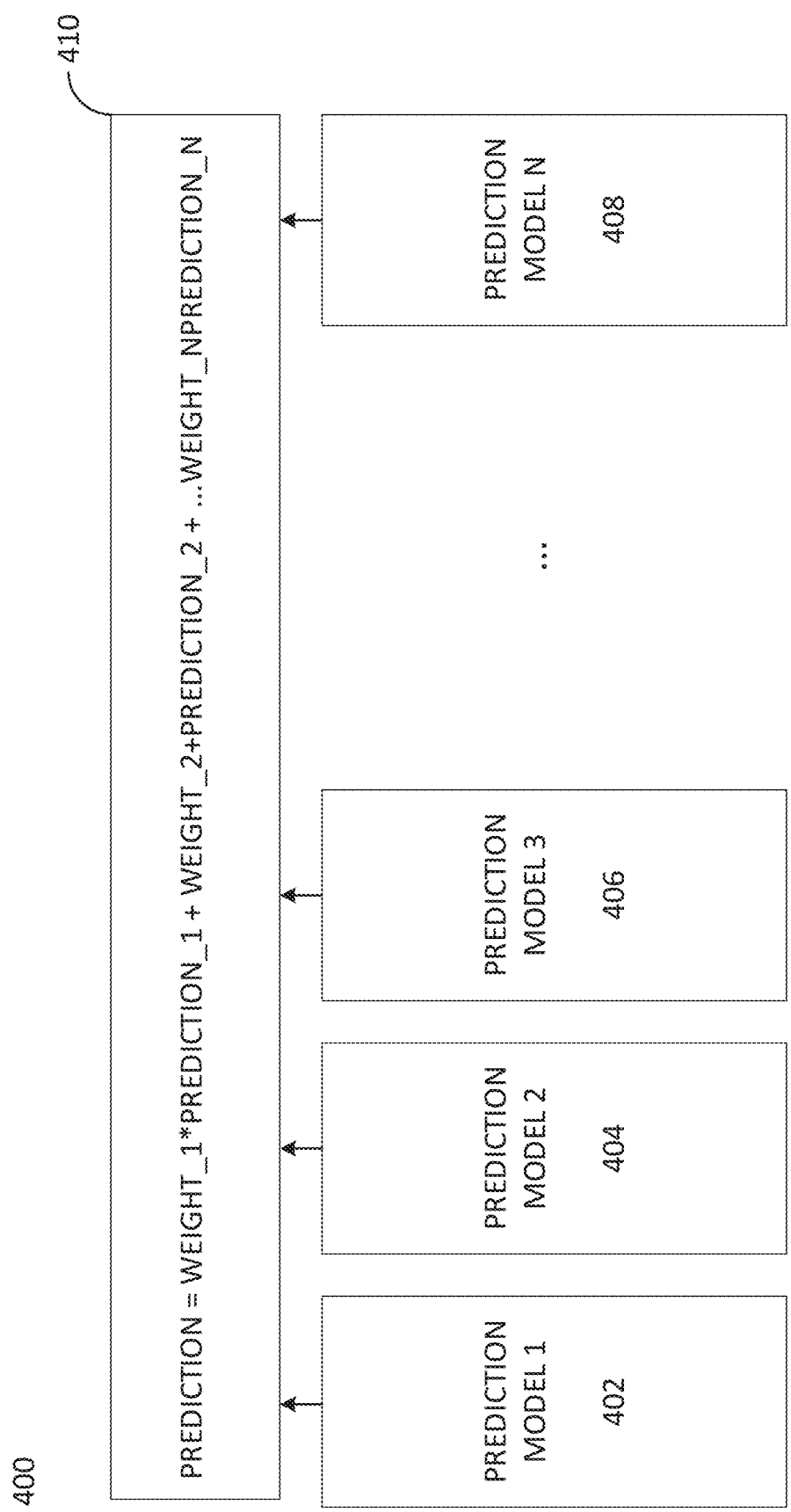
FIG. 4 shows a diagram of multiple prediction models that may be generated for a digital media and weighted to generate an overall prediction of popularity in accordance with embodiments of the present disclosure.

FIG. 4 shows a diagram 400 of multiple prediction models that may be generated for a digital media and weighted to generate an overall prediction of popularity in accordance with embodiments of the present disclosure. As shown by diagram 400, N number of predictions models 402, 404, 406, to 408 (Prediction model N) may be generated for a digital media to predict popularity of the digital media. Each prediction model may include one or more baseline regression models. The one or more baseline regression models may include multi linear regression, LASSO regression, ridge regression, or tree regression models. Each prediction model may further include one or a combination of features regarding the digital media. The one or more features may be the temporal, social, content, and metadata features previously discussed. In model 410, an overall prediction of popularity for digital media may be generated. The overall prediction includes a combination of each of the individual generated prediction models 402, 404, 406, to 408. Each of the individual generated prediction models may be weighted. The weightings may be based on analysis of one or more data sets of digital media, such as articles, websites, blogs, and the like. The datasets may be historical datasets including media data from a prior time period. Alternatively, the datasets may be concurrent datasets that are built in real-time and updated dynamically to in real-time. The weightings may be determined offline from the historical datasets, dynamically and in real-time using the historical datasets, or dynamically and in real-time using the concurrent datasets that include live digital media.

Experimental Results

Methods reflected by embodiments of the present disclosure were tested using a historical set of test articles. In one such experiment, 105 features were extracted for each article of the set. The features were organized and evaluated for their improvement over a baseline regression model used alone. The baseline regression models tested were multi linear regression, LASSO regression, ridge regression, and tree regression models. All experiments are conducted using 10-fold cross validations and the average Adjusted R2 (AdjR2) value was used to report the performance. Besides overall performance, performance of the models on viral articles was also analyzed. Therefore, in each fold of the run the models were tested on two different data sets: one containing all test articles in that fold for the run, and the other containing only 1% of most popular articles in the test set.

Table 1, shown below, compares the performance of multiple regression models over the test datasets.

TABLE 1

| MODEL | COMPLETE (Adj $R^2$) | TOP 1% ($R^2$) |
|---|---|---|
| Multi Linear Regression (MLR) | 79.4 | 78.2 |
| LASSO Regression | 72 | 52.1 |
| Ridge Regression | 80.3 | 54.5 |
| Tree Regression | 82.9 | 42.5 |

As shown by Table 1, tree-based regression performs the best on the complete dataset but does not perform as well on the viral dataset. Ridge regression similarly performed well on the complete dataset, but not as well on the viral dataset. LASSO regression did not perform as well as the other models on the complete dataset, and was one of the lower performing models on the viral dataset. On the other hand, the multiple linear regression (MLR) model had a relatively constant, satisfactory performance over both test datasets. This approach was utilized for the rest of the experiments as the baseline model.

The baseline model may utilize the strongest signal for predicting page views, which may be the log-transformed number of page views in the first 30 minutes after the publication of article. The overall dataset contains more than 41K articles that were published between September and October 2014, out of which metadata information is available for 37K articles. Therefore, about 4K articles in our dataset had missing metadata features for zero as the default value for metadata was used. Additionally, for articles that had not been tweeted, custom default values to fill the missing features were used. The results show that the model is robust enough to deal with missing values.

Table 2, reflected below, shows the result of our regression analysis on this dataset.

TABLE 2

| Model | COMPLETE (Adj $R^2$) | TOP 1% ($R^2$) |
|---|---|---|
| Baseline | 69.4 | 74 |
| Baseline + Temporal | 70.4 | 72.1 |
| Baseline + Social | 72.5 | 77.3 |
| Baseline + Content | 71.1 | 79.3 |
| Baseline + Content - Freshness | 70.6 | 79 |
| Baseline + Metadata | 77.2 | 78.1 |
| All Features | 79.4 | 78.2 |

If the full set of features is used, performance of the baseline method was improved by 10%. The baseline adjusted $R^2$ for the complete dataset was 69.4, and using the full feature set provides a 10% boost over the baseline.

Figure 5:
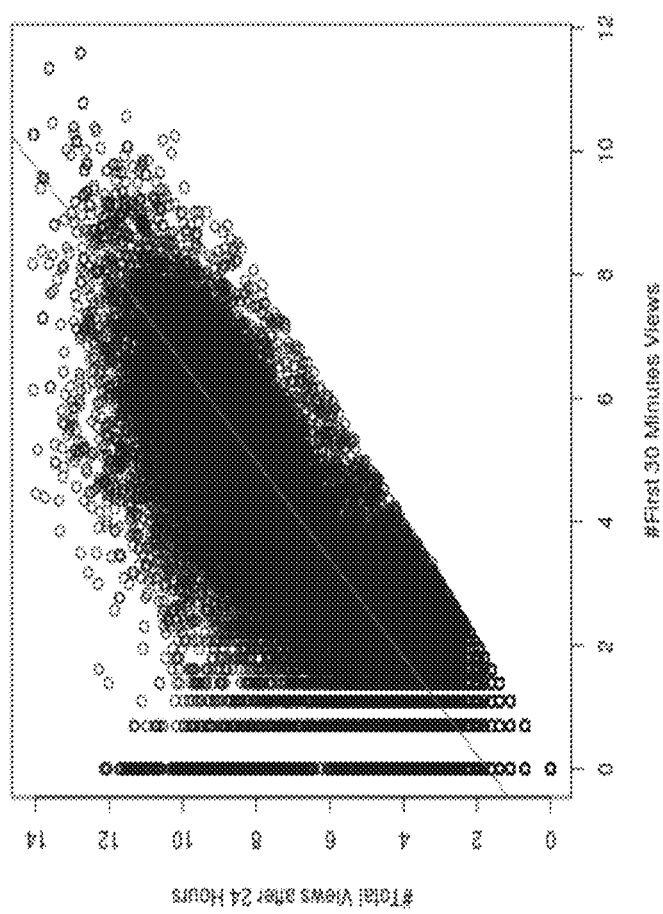
FIG. 5 shows an experimental plot of the total views after 24 hours versus views in the first 30 minutes in accordance with embodiments of the present disclosure.
Figure 6:
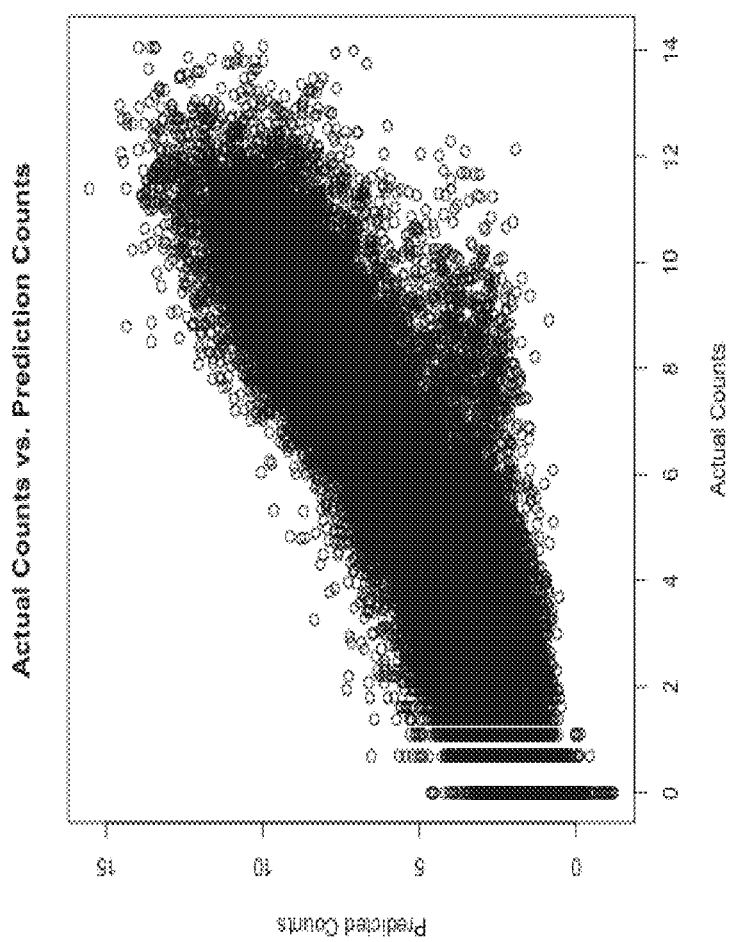
FIG. 6 shows a plot of the predicted counts versus actual counts of the baseline plus full features using the complete dataset in accordance with embodiments of the present disclosure.

FIGS. 5 and 6 show further experimental results. FIG. 5 shows a plot of the total views after 24 hours versus views in the first 30 minutes. FIG. 6 shows a plot of the predicted counts versus actual counts of the baseline plus full features using the complete dataset. FIG. 6 shows that the baseline plus full features has an improved prediction of popularity.

From experimental analysis, among the temporal features, the page view time-series and its normalized time-series may provide the most impact in popularity prediction, and thereby be the most important features. Among the social features, tweet time difference, number of followers in the first 30 minutes, retweet, and normalized retweet time series may provide the most impact in popularity prediction. Among the content features, top ten stories page view, top ten stories content similarity, title length, probability of content neutrality and compoundness, and SMOG Index (i.e., measure of readability based on years of education needed to understand writing) may provide the most impact in popularity prediction. Table 3 shows the results when only the so called most important features are used along with the baseline model.

TABLE 3

| | Adj $R^2$ | Important Features |
|---|---|---|
| Temporal | 70.3 | Page View Count and Normalized Page View Count time-series |
| Social | 72.5 | Tweet time difference, Number of followers in the first 30 minutes, and retweet and normalized retweet time-series |

TABLE 3-continued

| | Adj $R^2$ | Important Features |
|---|---|---|
| Content | 70.9 | Top ten stories page view, top ten stories content similarity, title length, Probability of content neutrality and compoundness, and SMOG Index |

As shown in Table 3, the performance using only important temporal features is very close to the performance when all temporal features are used as shown in Table 2. Table 3 shows the analysis for the full data set. For example, the $R^2$ value is 70.3 when important features are used, versus 70.4 when all temporal features are used. Similar results occur for social and content features. For important social features, the result is 72.5 which is the same as when all social features are used. For important content features, the result is 70.9 versus 71.1 when all of the content features are used.

Similar results occur when the viral data set is examined. Table 4 reflects the results from the viral data set when only the most important features are used. Topic intersection was found to be one of the more important features of the content features. Compoundness of the content was not found to be as important and the readability features were also not found to be important. Features related to freshness were important.

TABLE 4

| | Adj $R^2$ | Important Features |
|---|---|---|
| Temporal | 72.6 | Page View Count and Normalized Page View Count time-series |
| Social | 77.3 | Tweet time difference, Number of followers in the first 30 minutes, and retweet and normalized retweet time-series |
| Content | 79.4 | Top ten stories page view, top ten stories content similarity, title length, Probability of content neutrality, topic intersection. |

As shown in Table 4, the performance using only important temporal features is very close to the performance when all temporal features are used as shown in Table 2. For example, the $R^2$ value is 72.6 when important temporal features are used, versus 72.1 when all temporal features are used. Similar results occur for social and content features. For important social features, the result is 77.3 which is the same as when all social features are used. For important content features, the result is 79.4 versus 79.3 when all of the content features are used.

Additional Aspects

Figure 7:
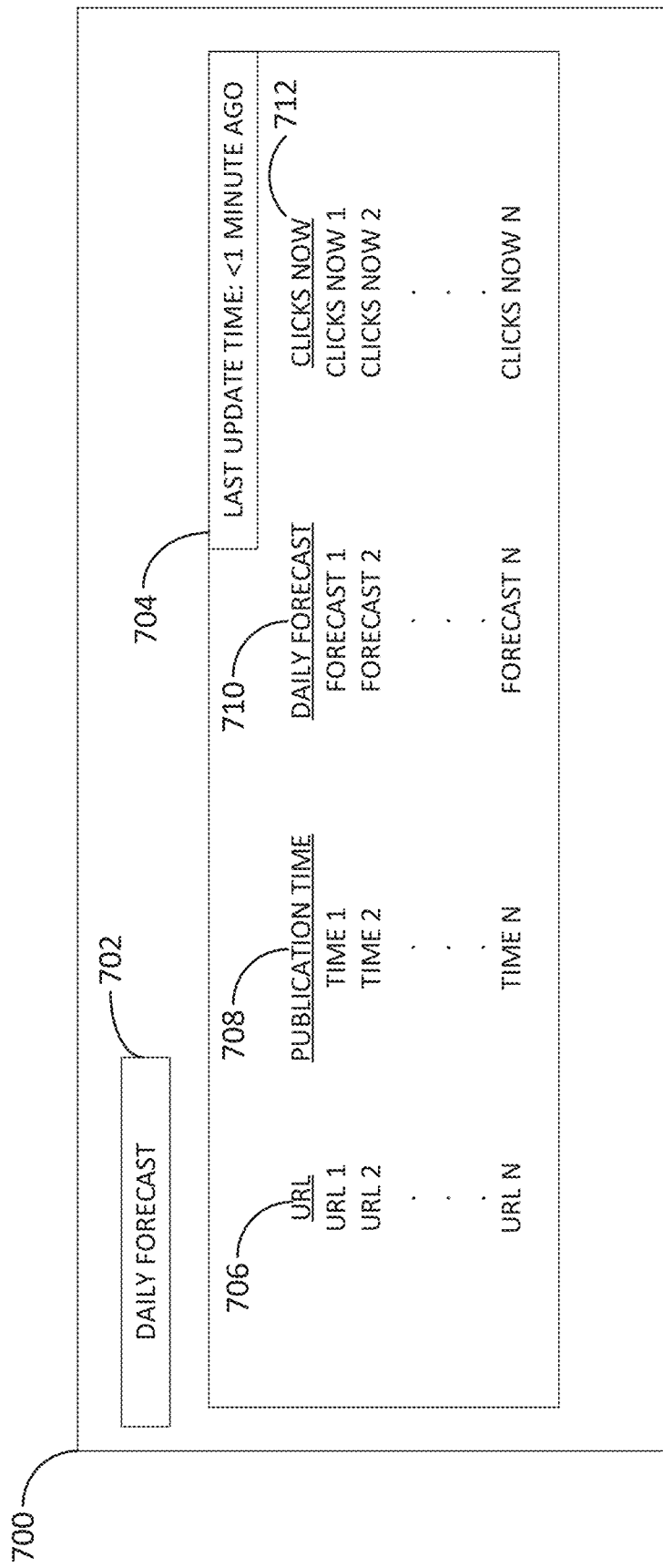
FIG. 7 shows an example interface in accordance with embodiments of the present disclosure.

Dashboard 116 may be embodied as an interface 700 shown in FIG. 7. Interface 700 may be a graphical user interface, and may be viewed on a computing device such as a personal computer, cellular phone, tablet, or the like. As shown by FIG. 7, interface 700 may include title section 702. Title section 702 may display the kind of information that is displayed. For example, as shown in FIG. 7, title section 702 shows "DAILY FORECAST", which indicates that the forecast is for popularity of digital media that day. Area 704 shows the time when the forecast was last updated. As shown by FIG. 7, the last update was ran less than 1 minute ago in the example of FIG. 7. Area 706 indicates the URL of the digital media. The URL may be the complete URL, or may be the title of the digital media as a hyperlink. Area 708 shows the publication time. This is the time at which the URL went live—e.g., when the digital media at the corresponding URL was first made public. Area 710 indicates the daily forecast for the digital media. The daily forecast may be a popularity prediction generated by the processes indicated using system 100 and/or methods 200 or 300, for example. Area 712 indicates the number of times in real time that somebody has clicked on the digital media and actually viewed the digital media. Areas 702-712 may be moved around, deleted, and edited. Moreover, additional, fewer, or different information may be displayed in one or more of areas 702-712.

Figure 8:
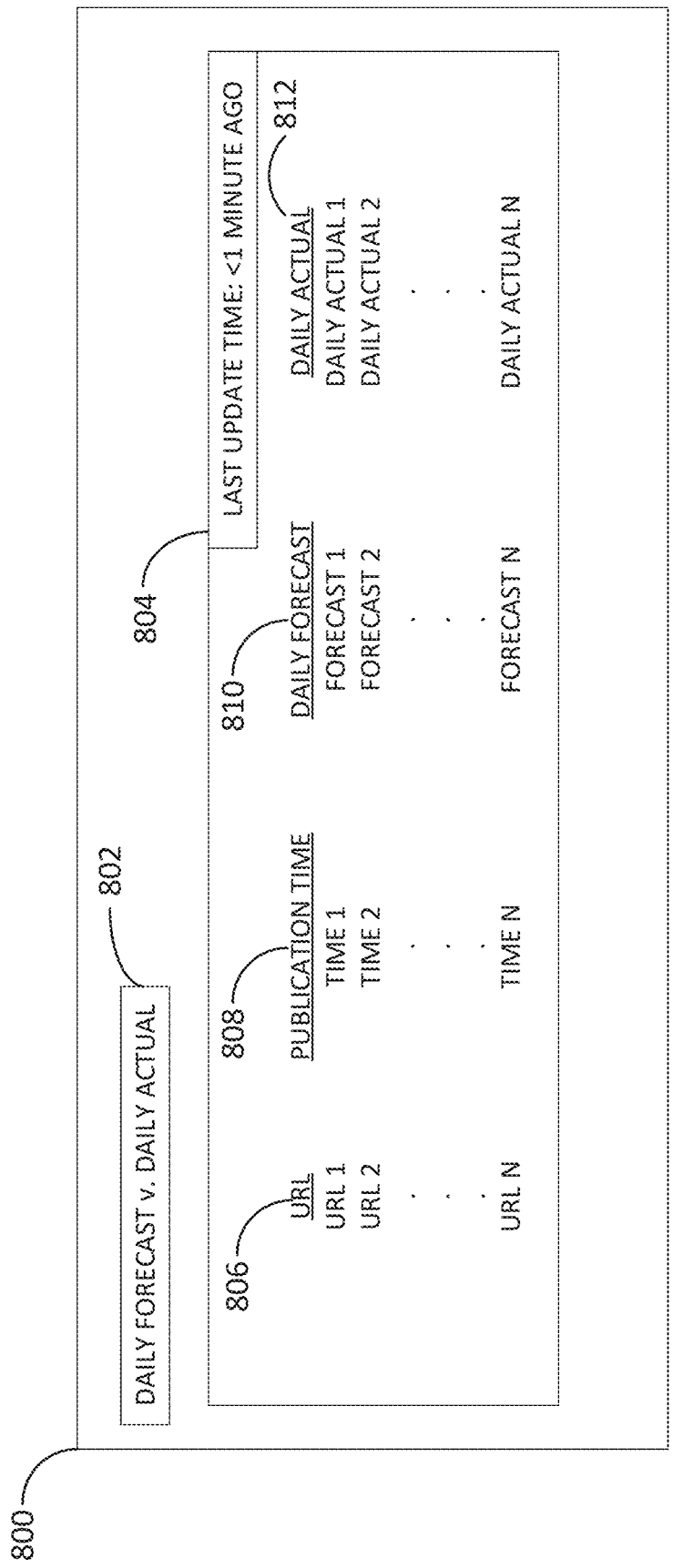
FIG. 8 shows an example interface in accordance with embodiments of the present disclosure.

FIG. 8 shows another interface 800 that may be viewed on a dashboard 116. Interface 800 may be a graphical user interface, and may be viewed on a computing device such as a personal computer, cellular phone, tablet, or the like. As shown by FIG. 8, interface 800 may include title section 802. Title section 802 may display the kind of information that is displayed. For example, as shown in FIG. 8, title section 802 shows "DAILY FORECAST v. DAILY ACTUAL", which indicates that the forecast is for popularity of digital media that day versus the actual daily popularity. As with interface 700, area 804 shows the time when the forecast was last updated. Area 806 indicates the URL of the digital media. The URL may be the complete URL, or may be the title of the digital media as a hyperlink. Area 808 shows the publication time. This is the time at which the URL went live—e.g., when the digital media at the corresponding URL was first made public. Area 810 indicates the daily forecast for the digital media. The daily forecast may be a popularity prediction generated by the processes indicated using system 100 and/or methods 200 or 300, for example. Area 812 indicates the daily actual popularity for the digital media. The daily actual popularity may show the actual number of clicks, views, shares, likes, or other interactions or a combination of interactions with the digital media. The daily actual popularity may be displayed in the same units as the daily forecast such that a comparison of predicted and actual popularity can be made. Alternatively, the daily actual popularity may be displayed in different units as the daily forecast. Areas 802-812 may be moved around, deleted, and edited. Moreover, additional, fewer, or different information may be displayed in one or more of areas 802-812.

Figure 9:
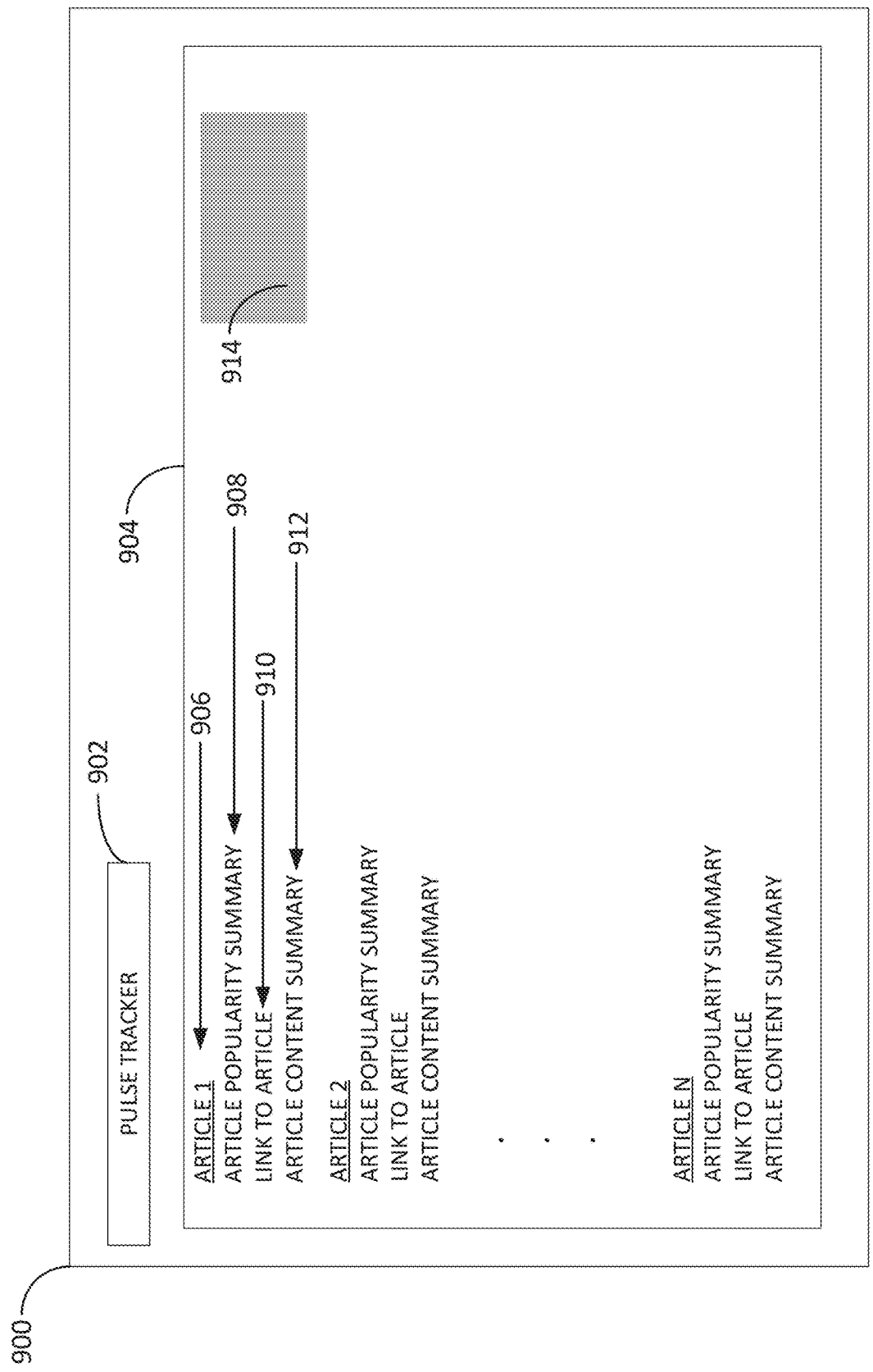
FIG. 9 shows an example interface in accordance with embodiments of the present disclosure.

FIG. 9 shows another interface 900 that may be displayed by dashboard 116. Interface 900 may be a graphical user interface, and may be viewed on a computing device such as a personal computer, cellular phone, tablet, or the like. As shown by FIG. 9, interface 900 may include title section 902. As shown by FIG. 9, section 902 indicates that interface 900 is a "PULSE TRACKER" which provides an easily navigable and sortable view of digital media. In FIG. 9, the digital media is website articles. However, other media is contemplated. Area 904 includes the list of articles. Each article includes an area 906 that includes the article name. Area 908 indicates a popularity summary of the article. For example, area 908 may list the number of views, number of predicted views, predicted view rate, and the like. An example message in area 908 may read "This article is red hot! 25162 clicks @30 mins and 100 k-200 k forecast!" Area 910 may include a link to the article. The link may be a complete URL, or may be the title of the digital media as a hyperlink. Area 912 includes an article content summary. An example article content summary may read, for example, information about the article such as "A severe winter storm will unleash crippling snow in DC." Area 914 may include a picture that is of relevance to the article. For example, area 914 may display a picture that accompanies the article when it is published. Areas 902-914 may be moved around, deleted, and edited. Moreover, additional, fewer, or different information may be displayed in one or more of areas 902-914.

Figure 10:
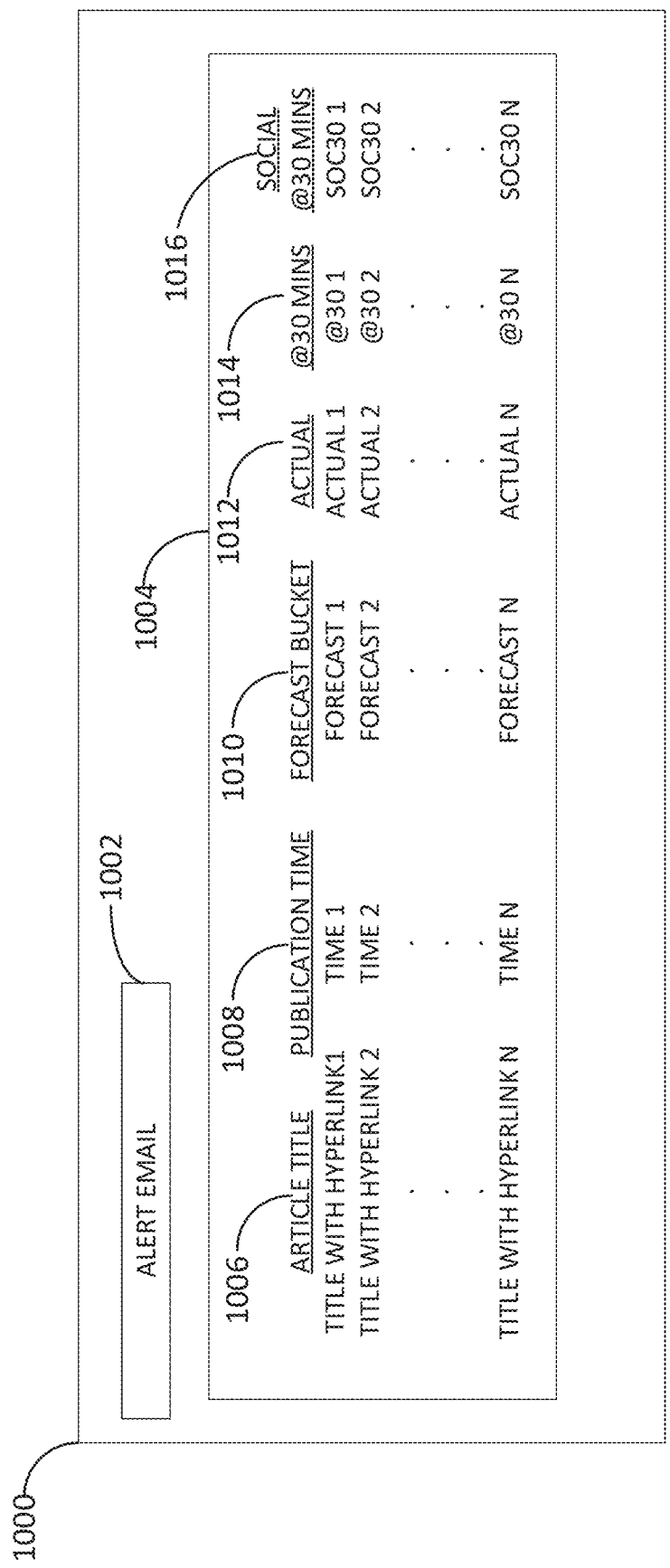
FIG. 10 shows an example alert email interface in accordance with embodiments of the present disclosure.

FIG. 10 shows an example alert email 1000 that may be sent by systems or in methods of the present disclosure. The email 1000 may be sent after popularity prediction for a digital media has been performed. Area 1002 indicates a title graphic area of the email and may indicate that the email is an alert regarding popularity prediction of digital media. Area 1004 may list the various digital media of the alert. In FIG. 10, the digital media is web site articles. However, other media is contemplated. Area 1006 includes the article title, and may include a link to the article. The link may be a complete URL, or may be embedded in the title of the digital media as a hyperlink. Area 1008 shows the publication time. This is the time at which the URL went live—e.g., when the digital media at the corresponding URL was first made public. Area 1010 shows the forecast bucket of popularity that the article falls in. This may be in units of views, interactions, shares, likes, or another indication or combination of indications associated with the article. Forecast buckets may be, for example, more than 100 k, less than 100 k, more than 150 k, less than 105 k, etc. Area 1012 shows the actual popularity of the article. Area 1014 shows the actual popularity of the article after 30 minutes of publication. Area 1016 shows the actual popularity of the article after 30 minutes of publication only on social media. Areas 1002-1016 may be moved around, deleted, and edited. Moreover, additional, fewer, or different information may be displayed in one or more of areas 1002-1016.

At this point it should be noted that techniques for predicting the popularity of media in accordance with the present disclosure as described above may involve the processing of input data and the generation of output data to some extent. This input data processing and output data generation may be implemented in hardware or software. For example, specific electronic components may be employed in a server or similar or related circuitry for implementing the functions associated with predicting the popularity of media in accordance with the present disclosure as described above. Alternatively, one or more processors operating in accordance with instructions may implement the functions associated with predicting the popularity of media in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. An article of manufacture for predicting the popularity of media, the article of manufacture comprising:
   at least one processor readable storage medium; and
   instructions stored on the at least one medium;
   wherein the instructions are configured to be readable from the at least one medium by at least one processor and thereby cause the at least one processor to operate so as to:
      determine a publication time associated with digital media;
      set a predetermined time threshold based on the publication time;
      analyze the digital media to determine at least one feature associated with the digital media;
      compile the determined at least one feature;
      predict a popularity associated with the digital media based on the compiled at least one feature; and
      output the predicted popularity,
      wherein the at least one feature associated with the digital media comprises a temporal feature and is determined before the predetermined time threshold, wherein the temporal feature comprises a time difference between a publishing time of the digital media and a first view of the digital media.

2. The article of manufacture of claim 1, wherein the at least one feature further comprises one or more of a social feature, contextual feature, and metadata feature associated with the digital media.

3. The article of manufacture of claim 2, wherein the social feature comprises a time difference between the publication time associated with the digital media and a first post or interaction on one or more social media platforms regarding the digital media.

4. The article of manufacture of claim 2, wherein the social feature comprises a number of posts on one or more social media platforms regarding the digital media in a first time period after the publication time associated with the digital media.

5. The article of manufacture of claim 2, wherein the social feature comprises a rate at which the digital media is shared within a first time period after the publication time associated with the digital media.

6. The article of manufacture of claim 2, wherein the contextual feature comprises one or more sentiment scores regarding a title of the digital media and a body of the digital media.

7. The article of manufacture of claim 2, wherein the contextual feature comprises one or more of a number of named entities that are present in the digital media.

8. The article of manufacture of claim 2, wherein the contextual feature comprises a freshness rating that indicates relevancy of the digital media compared to other digital media.

9. The article of manufacture of claim 1, wherein the temporal feature further comprises a number of views of the digital media within a first time period after publication.

10. The article of manufacture of claim 1, wherein the temporal feature further comprises a rate at which the digital media is read within a first time period after publication.

11. The article of manufacture of claim 1, wherein the temporal feature further comprises a time series of views of the digital media in a first time period after publication.

12. The article of manufacture of claim 1, wherein the predicting comprises calculating a plurality of predictions using a plurality of different regression models.

13. The article of manufacture of claim 12, wherein the plurality of different regression models are each used in combination with a different one of the at least one feature associated with the digital media.

14. The article of manufacture of claim 13, wherein the plurality of predictions are weighted and combined to form an overall prediction associated with the digital media.

15. A system for predicting the popularity of media, the system comprising:
    one or more processors communicatively coupled to a network; wherein the one or more processors are configured to:
        determine a publication time associated with digital media;
        set a predetermined time threshold based on the publication time;
        analyze the digital media to determine at least one feature associated with the digital media;
        compile the determined at least one feature;
        predict a popularity associated with the digital media based on the compiled at least one feature; and
        output the predicted popularity,
        wherein the at least one feature associated with the digital media comprises a temporal feature and is determined before the predetermined time threshold, wherein the temporal feature comprises a time difference between a publishing time of the digital media and a first view of the digital media.

16. The system of claim 15, wherein the predicting comprises calculating a plurality of predictions using a plurality of different regression models.

17. The system of claim 16, wherein the plurality of different regression models are each used in combination with a different one of the plurality of features.

18. The system of claim 17, wherein the plurality of predictions are weighted and combined to form an overall prediction associated with the digital media.

19. A system for predicting the popularity of media, the system comprising:
    at least one processor configured to:
        determine a publication time associated with digital media;
        set a time threshold based on the publication time;
        analyze the digital media, the analyzing comprising determining a plurality of features associated with the digital media, wherein the plurality of features comprises a temporal feature that is determined before the time threshold, wherein the temporal feature comprises a time difference between a publishing time of the digital media and a first view of the digital media;
        compile the determined plurality of features in real time along with activity associated with the digital media, the activity comprising a determined number of interactions with the digital media on at least one social media platform; and
        predict a popularity associated with the digital media based on the compiled plurality of features and activity; and
    at least one memory, coupled to the at least one processor, configured to provide the at least one processor with instructions.

20. A method for predicting the popularity of media, the method comprising:
    determining a publication time associated with digital media;
    setting a predetermined time threshold based on the publication time;
    analyzing the digital media to determine at least one feature associated with the digital media;
    compiling the determined at least one feature;
    predicting a popularity associated with the digital media based on the compiled at least one feature; and
    outputting the predicted popularity,
    wherein the at least one feature associated with the digital media comprises a temporal feature and is determined before the predetermined time threshold, wherein the temporal feature comprises a time difference between a publishing time of the digital media and a first view of the digital media.

21. A method for predicting the popularity of media, the method comprising:
    determining a publication time associated with digital media;
    setting a time threshold based on the publication time;
    analyzing the digital media, the analyzing comprising determining a plurality of features associated with the digital media, wherein the plurality of features comprises a temporal feature that is determined before the time threshold, wherein the temporal feature comprises a time difference between a publishing time of the digital media and a first view of the digital media;
    compiling the determined plurality of features in real time along with activity associated with the digital media, the activity comprising a determined number of interactions with the digital media on at least one social media platform; and
    predicting a popularity associated with the digital media based on the compiled plurality of features and activity.

* * * * *